United States Patent Office 2,822,376
Patented Feb. 4, 1958

2,822,376

REACTION OF PHOSPHINE WITH α,β-UNSATURATED COMPOUNDS

Ingenuin Hechenbleikner, Clarkesburg, Mass., and Michael M. Rauhut, Stamford, Conn., assignors to American Cyanamid Company, New York, N. Y., a corporation of Maine No Drawing. Application February 27, 1957
Serial No. 642,638

13 Claims. (Cl. 260—465.1)

This invention relates to the preparation of organic phosphines. More particularly, it relates to the base-catalyzed reaction of an olefin with phosphine to prepare an organo phosphine. Still more particularly, the invention is concerned with the base-catalyzed reaction of phosphine and an olefin containing an electro-negative substituent positioned adjacent to the double bond carbon atom.

In the past, attempts have been made to produce organic phosphines by the addition of phosphine to α,β-unsaturated olefin compounds, both in the presence and absence of catalysts. These attempts have not proven wholly successful, particularly where the olefin contains a negatively-substituted substituent. In such instances, the phosphine-reaction product is often obtained in low overall yield either as an intractable polymer where a catalyst is absent or, where present, the phosphine-olefin reaction is difficult to control with respect to the formation of mono-, di- or tri-substituted organo phosphines. Since the latter products are gaining in prominence as plasticizers for polyacrylonitrile, insecticides and chelating agents, a process whereby good yields of mono- or poly-organo phosphine products can be controlled would be highly desirable.

According to this invention, it has been found, unexpectedly, that the shortcomings of the prior practice can be overcome in a simple and straight-forward manner. According to the present invention, the olefin-phosphine reaction is caused to proceed smoothly even at ordinary temperatures and pressures by being carried out in the presence of a suitable strongly-alkaline catalyst. Not only can predetermined quantities of mono- di- or tri-substituted organo phosphines or mixtures of the same be obtained as desired product, but the products are substantially free from polymer.

A large variety of olefins may be employed as the olefin reactant. Of particular interest are the substituted olefins containing an electronegative grouping adjacent to the carbon of the double bond, as for example: acrylonitrile, acrylamide, 2-cyano-butenyl-1, nitroethylene, methyl ethylenesulfonate, vinylisobutyl ketone, mesityl oxide, diethyl maleate, maleic anhydride and the like. These substituted olefins which were previously thought to be unsuitable lend themselves to ready reaction with phosphine according to this invention.

Phosphine is a stable article of commerce. Its manufacture is well known and therefore does not form a part of this invention.

It is an advantage of the present invention that readily-available strongly-alkaline catalysts are effective for promoting the reaction. In general, any strong base which is capable of being ionized or hydrolyzed in aqueous solution is contemplated. These bases are the oxides, hydroxides, alcoholates of the alkali metals or the alkali metals per se. In this group are, for example, sodium hydroxide, potassium hydroxide, sodium oxide, potassium methylate and sodium ethylate as well as lithium hydroxide and the metals previously mentioned. Also suitable are alkyl-substituted nitrogen bases, such as tetramethylguanidine, pentamethylguanidine, pentamethylbiguanide, hexamethylbiguanide, or heptamethylbiguanide, as well as the strongly basic non-metallic quaternary ammonium hydroxides among which are included: trimethylbenzylammonium hydroxide, dimethyldibenzylammonium hydroxide and the like. Contemplated also are the strongly basic quaternary ammonium ion exchange resins, such as commercially available Dowex-2. The catalyst may be added per se or in a suitable inert aqueous or organic solvent.

The reaction of the invention proceeds in the presence of relatively small amounts of alkaline catalyst, usually in the range of from about 0.1% to about 15% by weight of the reactants. In general, an amount in the range of from about 0.3% to about 5.0% is preferred. However, the rate of phosphine reaction decreases rapidly when the catalyst strength is insufficient. The use of larger amounts or more concentrated catalyst, on the other hand, tends to increase the reaction rate and can simultaneously cause polymerization of the reacted olefin.

It has been found that the most convenient method is the addition of the phosphine to the alkaline catalyst admixed with the olefin. Alternatively, the olefin may be added to the phosphine-alkaline catalyst mixture. The order of addition is not particularly critical but will depend upon the predominant end product desired. This will be more fully discussed below.

In general, all the reactants may be charged to a reactor simultaneously. It is advantageous, however, to provide an inert solvent for the olefin monomer prior to reaction, although its employment is not critical. Suitable inert solvents are: acetonitrile, benzene, dioxane and the like.

In general, the reaction takes place at temperatures ranging from about minus 25° C. to above about 100° C., and preferably from about minus 10° C. to about 30° C. Atmospheric pressure is usually employed but pressures in excess of atmospheric may be used in order to recover predominately mono-, di- or tri-organo phosphines as desired. Superatmospheric pressures, usually from above about 15 to about 100 atmospheres or higher have been found to be quite advantageous.

As previously stated, the control in the formation of mono-, di- or tri-organo phosphine derivatives surprisingly is made possible by the process of the present invention. However, in order to control the predominant formation of the mono-, di- or tri-organo phosphine and insure the absence of substantial admixture, four factors in the main must be considered. These are, in order of import:

(1) Maintenance of a preselected mol ratio of phosphine to negatively-substituted olefin;
(2) Rate of addition of the olefin reactant;
(3) The use of relatively low temperatures; and
(4) The use of a relatively dilute, strongly basic catalyst.

In general, when the mol ratio of reactants in (1) above is predetermined theoretically to obtain mono-, di or tri-organo phosphines, then the three remaining factors outlined above come into sharp focus, particularly since all the factors are interrelated. Assuming, for example, that a mono-organo phosphine is principally desired, the reaction must involve of course the ultimate presence of equimolecular amounts of the phosphine and the desired olefin. As soon as this mol ratio is established, the reaction is advantageously carried out under a superatmospheric pressure, say in the range of from about four to about twenty atmospheres, in the presence of not more than about 15% base catalyst, based on the weight of the olefin reactant. In addition, the olefin reactant should be added slowly to the reaction at a rate sufficient to prevent olefin excess with respect to phosphine at any one instance prior to reaction. Where this procedure is not followed and all the olefin is initially added, then the reaction favors the formation of predominant amounts of di- or tri-organo phosphines.

As above indicated, elevated temperatures may be used but such temperatures should be avoided where it is desired to form mono-organo phosphines. In general, temperatures of from about minus 10° C. to about plus 30° C. are preferred for optimum results. Higher temperatures favor the formation of di- and tri-organo phosphines.

The utilization of basic catalyst is also an important factor. However, if the concentration of the basic catalyst is too dilute, namely less than about 0.1% based on olefin reactant, no appreciable reaction takes place. It is preferred, however, to operate with sufficient basic catalyst. However, where the concentration of base is increased such as by the addition of more than about 15% by weight, polymerization of the olefin can occur with attendant loss in overall yield.

As will be readily appreciated from the discussion of the factors previously mentioned, predominant amounts of di- or tri-organo phosphines are obtained by adding the olefin prior to reaction. Where a tri-organo phosphine predominately is desired, it is an advantage that atmospheric pressure rather than superatmospheric pressure can be used. In addition, the total initial addition of the olefin reactant may also be suitably used. In this manner, predominant amounts of the di- or tri-organo phosphine is produced, depending upon the ratio of reactants employed.

The invention will be illustrated in conjunction with the following examples which are to be taken as illustrative only and not by way of limitation.

*Example 1*

A solution of 8.0 parts (0.15 mole) of acrylonitrile in 150 parts of acetonitrile containing 5 parts of 10 N aqueous potassium hydroxide is added to a suitable pressure vessel or autoclave. Phosphine is continuously added slowly to the autoclave for a period of about two and one half hours while agitating and cooling the autoclave to about 8° C. The initial pressure in the autoclave is 50 p. s. i. g. and the pressure at the termination of the reaction is 42 p. s. i. g. It is found that about 0.09 mole of phosphine is absorbed.

The contents are then removed from the autoclave and placed in a separatory funnel. The lower aqueous phase is withdrawn and discarded. The upper organic phase is washed with three portions of saturated sodium chloride solution and dried with anhydrous sodium sulfate. The latter is removed by filtration and the filtrate is distilled under reduced pressure. A fraction boiling at 54° C.–55° C. at 9 mm. Hg pressure amounting to a 48% yield of 2-monocyanoethylphosphine based on acrylonitrile is obtained. Bis(2-cyanoethyl)phosphine is recovered in 12% yield at 157° C.–159° C. and 0.3 mm. Hg pressure. No appreciable amount of tris(2-cyanoethyl)phosphine could be detected as such.

*Example 2*

8 parts of acrylonitrile containing 0.8 part of methanesulfonic acid is shaken with phosphine for two and one half hours in a suitable autoclave maintained at 25° C. The initial recorded pressure is 31 p. s. i. g. and does not vary during the period of agitation. The lack of a pressure drop indicates that no reaction is taking place. When the contents of the flask are removed, they are subjected to infra-red analysis. No mono-, bis- or tris(2-cyanoethyl)phosphine product is present.

*Example 3*

A solution of 20 parts (0.38 mole) of acrylonitrile and 25 parts of acetonitrile containing 10 parts of 10 N aqueous potassium hydroxide is charged to a reaction vessel. Phosphine at atmospheric pressure is next added over an 80 minute period while agitating the contents therein maintained at a temperature from about 5° C. to 7° C. It is found that about 0.19 mole of phosphine is absorbed during reaction. At the termination of the reaction, the contents are placed in a suitable separatory funnel to recover the organic layer. The latter is washed several times with saturated sodium chloride solution and then dried with anhydrous sodium sulfate. The latter is removed from the mixture by filtration and the filtrate is distilled under reduced pressure. A 6% yield of 2-monocyanoethylphosphine, based on acrylonitrile is obtained at 54° C.–55° C. and 9 mm. Hg pressure. A 58% yield of bis(2-cyanoethyl)phosphine based on acrylonitrile is recovered at 158° C. and 0.3 mm. Hg pressure. The warm residue from the distillation is poured into ice water with vigorous agitation and the solid collected to obtain 13% tris(cyanoethyl)phosphine.

Similar yields are obtained when the temperature of reaction is reduced to about minus 7° C.

*Example 4*

Example 3 is repeated in every essential detail except that the acrylonitrile is slowly added over a period of sixty minutes instead of adding all the latter nitrile reactant. The yields of the mono- and di-substituted derivative increases to 12% mono(2-cyanoethyl)phosphine and 63% bis(2-cyanoethyl)phosphine, respectively. The quantity of tris(2-cyanoethyl)phosphine is not noticeably varied as compared with Example 3.

*Example 5*

79.5 parts (1.5 moles) of acrylonitrile are dissolved in 150 parts of acetonitrile containing 20 parts of Dowex 2 which may be generally represented as:

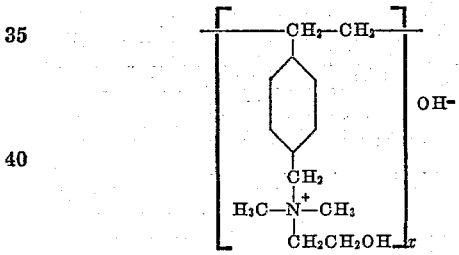

where $x$ is about 5000. The mixture is charged slowly to a suitable reactor to which is gradually added phosphine over a period of two hours and thirty minutes. The reaction temperature is maintained at 45° C.–50° C. The amount of phosphine absorbed is about 0.8 mole during reaction.

The contents in the reaction vessel are next filtered and the filtrate vacuum distilled as in Example 4 above. The yields of mono-, bis- and tris(2-cyanoethyl)phosphine recovered are 5%, 44% and 25%, respectively.

*Example 6*

20 parts (0.38 mole) of acrylonitrile containing 5 parts of 7 N sodium hydroxide are charged to a suitable reaction vessel heated to 60° C.–70° C. About 0.12 mole of phosphine is next introduced into the latter mixture over a period of 45 minutes. Resultant red and viscous reaction mixture was next dissolved in hot 15% acetic acid. The latter solution was decolorized with Darco (activated charcoal) and cooled to room temperature. The mixture is filtered. 7 parts of tris(2-cyanoethyl)phosphine corresponding to a 28% yield based on acrylonitrile was recovered. No mono- or bis(2-cyanoethyl)phosphine could be detected by infra-red analysis.

*Example 7*

In a suitable reaction vessel, a solution containing 350 parts of acetonitrile and 75 parts of 10 N potassium hydroxide is prepared. To the latter is gradually added 282 parts (5.3 mole) of acrylonitrile over a 90 minute period. Simultaneously, about 1.2 moles of phosphine is gradually added over the same period while agitating and maintaining the reaction temperature at from 15° C.–20° C.

Upon completion of the reaction, the contents are poured into ice water. A yellow solid is collected, then washed with ice water, followed by a cold methanol wash and then dried. 280 parts of tris(2-cyanoethyl)phosphine (M. P. 90° C.–94° C.) are obtained. This quantity corresponds to a yield of 80% based on the olefin reactant. After recrystallization from 10% acetic acid solution, the melting point was 98° C.–99° C.

*Example 8*

A solution of 23 parts (0.23 mole) of ethyl acrylate in 50 parts of acetonitrile containing 1.0 part of heptamethylbiguanide is shaken with phosphine for 72 minutes in a suitable autoclave. The pressure drops from 42 p. s. i. g. to 33 p. s. i. g. The temperature therein also increases from room temperature to about 54° C. After the reaction terminates, the reaction mixture is neutralized with concentrated hydrochloric acid, dried with anhydrous sodium sulfate and vacuum distilled. The distillation furnishes: 7.8 g. (25%) of 2-carbethoxyethylphosphine having a boiling point of 63° C.–67° C. (22 mm. Hg); 3.3 g. (6%) of bis(2-carbethoxyethyl)phosphine having a boiling point of 105° C.–108° C. (0.1 mm. Hg); and 10.9 g. (42%) of tris(2-carbethoxyethyl)phosphine having a boiling point of 155° C.–165° C. (0.4 mm. Hg).

*Example 9*

A mixture containing 50 parts of acrylamide, 200 parts of acetonitrile and 2.0 parts pentamethylguanidine is agitated with phosphine at 45 to 60 p. s. i. g. and room temperature for 16 hours. Resultant reaction mixture, a chalky mass, is diluted with 200 parts of acetonitrile and filtered. The white product is washed with acetonitrile and then with ether. The wet product is dried in a vacuum desiccator over sulfuric acid. Once again, the product is washed with isopropyl alcohol followed by ether and the product vacuum dried. 31 parts of mixed 2-carbamylethylphosphines were obtained.

*Example 10*

A solution of 91.3 parts (0.4 mole) of lauryl acrylate and 2.0 parts of pentamethylguanidine in 150 parts of acetonitrile is agitated with phosphine for 3 hours at 3 to 4 atmospheres and room temperature. The reaction mixture consisted of two liquid layers. The lower layer is separated, dissolved in 200 ml. of ether, and the solution washed three times with dilute hydrochloric acid and twice with water. The solution was dried with anhydrous sodium sulfate, and the ether was evaporated under vacuum. 90 parts of a pale yellow liquid mixture of 2-carbolauroxyethylphosphines was obtained. Infra-red analysis showed that the product was free of lauryl acrylate.

We claim:

1. A process for preparing an organophosphine which comprises: reacting of from one to three moles of an olefin containing an electronegative substituent positioned adjacent to the double bond of said olefin with one mole of phosphine in the presence of a strongly alkaline catalyst at temperatures not to exceed about 100° C., said catalyst being present from about 0.1% to about 15% by weight based upon said olefin, and wherein the latter olefin is selected from the class consisting of acrylonitrile, acrylamide, ethylacrylate and laurylacrylate.

2. A process according to claim 1 in which the catalyst is an alkali metal hydroxide.

3. A process according to claim 1 in which the catalyst is a lower alkyl-polysubstituted biguanide.

4. A process according to claim 1 in which the catalyst is a basic quaternary ammonium salt.

5. A process for preparing an organophosphine which comprises: gradually adding one mole of phosphine and from one to three moles of an olefin containing an electronegative substituent positioned adjacent to the double bond of said olefin to a reaction medium consisting essentially of a strongly alkaline catalyst at temperatures not to exceed about 100° C., said catalyst being present from about 0.1% to about 15% based upon the weight of said olefin, and wherein the latter olefin is selected from the class consisting of acrylonitrile, acrylamide, ethylacrylate and laurylacrylate.

6. A process according to claim 5 in which the olefin is acrylonitrile.

7. A process according to claim 5 in which the olefin is acrylamide.

8. A process according to claim 5 in which the olefin is ethylacrylate.

9. A process for preparing predominantly monoorganophosphine which comprises: adding gradually about one mole of phosphine and one mole of an olefin containing an electronegative substituent positioned adjacent to the double bond of said olefin to reaction medium consisting essentially of a strongly alkaline catalyst at superatmospheric pressure and temperatures up to about 30° C., said catalyst being present from about 0.1% to about 15% based upon the weight of said olefin, and wherein the latter olefin is selected from the class consisting of acrylonitrile, acrylamide, ethylacrylate and laurylacrylate.

10. A process for preparing predominately di-organophosphine which comprises: initially adding about two moles of an olefin containing an electronegative substituent positioned adjacent to the double bond of said olefin to a basic reaction medium containing of from 0.1% to 15% of a base catalyst, introducing about one mole of phosphine into said medium, and recovering a mixture comprising principally di-organophosphine product, said olefin reactant being selected from the group consisting of acrylonitrile, acrylamide, ethylacrylate and laurylacrylate.

11. A process for preparing predominately tri-organophosphine which comprises: initially adding about three moles of an olefin containing an electronegative substituent positioned adjacent to the double bond of said olefin to a basic reaction medium containing of from 0.1% to 15% of a base catalyst, introducing about one mole of phosphine into said reaction medium at temperatures up to about 100° C., and recovering predominately the corresponding tri-organophosphine product, said olefin reactant being selected from the group consisting of acrylonitrile, acrylamide, ethylacrylate and laurylacrylate.

12. A process according to claim 11 in which the olefin is acrylonitrile.

13. A process according to claim 5 in which the olefin is laurylacrylate.

References Cited in the file of this patent

UNITED STATES PATENTS 2,579,580    Howk et al. _____ Dec. 25, 1951

FOREIGN PATENTS 673,451    Great Britain _____ June 4, 1952